United States Patent
Ruggiero et al.

(10) Patent No.: US 10,959,566 B2
(45) Date of Patent: Mar. 30, 2021

(54) CONTROL SYSTEM FOR PUMP OF BEVERAGE PREPARATION MACHINE

(71) Applicant: Nestec S. A., Vevey (CH)

(72) Inventors: Martino Ruggiero, Morges (CH); Sergio Chioda, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 412 days.

(21) Appl. No.: 15/740,417

(22) PCT Filed: Jul. 1, 2016

(86) PCT No.: PCT/EP2016/065453
§ 371 (c)(1),
(2) Date: Dec. 28, 2017

(87) PCT Pub. No.: WO2017/005618
PCT Pub. Date: Jan. 12, 2017

(65) Prior Publication Data
US 2018/0192817 A1 Jul. 12, 2018

(30) Foreign Application Priority Data
Jul. 3, 2015 (EP) .................................. 15175206

(51) Int. Cl.
*A47J 31/52* (2006.01)
*F04B 17/04* (2006.01)
*F04B 49/20* (2006.01)

(52) U.S. Cl.
CPC ............. *A47J 31/52* (2013.01); *A47J 31/525* (2018.08); *F04B 17/042* (2013.01); *F04B 49/20* (2013.01)

(58) Field of Classification Search
CPC .......... A47J 31/46; A47J 31/52; A47J 31/525; A47J 31/5253; A47J 31/5255; F04B 17/042; F04B 49/20
(Continued)

(56) References Cited

U.S. PATENT DOCUMENTS

| | | | | |
|---|---|---|---|---|
| 4,628,235 A | * | 12/1986 | Goings | ..................... H02P 7/06 318/430 |
| 8,232,755 B2 | * | 7/2012 | Jeung | ....................... H02P 6/20 318/400.26 |

(Continued)

FOREIGN PATENT DOCUMENTS

| | | |
|---|---|---|
| EP | 1985857 A2 | 10/2008 |
| EP | 2107242 A1 | 10/2009 |
| EP | 2180812 A1 | 5/2010 |

OTHER PUBLICATIONS

International Search Report, dated Oct. 6, 2016, in PCT/EP2016/065453, filed Jul. 1, 2016.
(Continued)

*Primary Examiner* — Patrick Hamo
*Assistant Examiner* — Joseph S. Herrmann
(74) *Attorney, Agent, or Firm* — K&L Gates LLP (57) ABSTRACT

A beverage or foodstuff preparation machine is disclosed that includes a component processing unit and a control system, wherein the component processing unit includes a pump arranged to deliver fluid. Also disclosed are methods of making and using the beverage or foodstuff preparation machine. Also disclosed are methods of controlling the pump of the beverage or foodstuff preparation machine. Further disclosed is a computer program for a processor of the control system of the beverage or foodstuff preparation machine, as well as a non-transitory computer readable medium that includes the computer program.

11 Claims, 5 Drawing Sheets

| Step | Step Duration (ms) | Time (ms) | Percentage of pulse cut (%) | Pump power (%) |
|---|---|---|---|---|
| 0 | 400 | 0 | 75% | 25% |
| 1 | 380 | 400 | 70% | 30% |
| 2 | 360 | 780 | 65% | 35% |
| 3 | 340 | 1140 | 60% | 40% |
| 4 | 320 | 1480 | 55% | 45% |
| 5 | 300 | 1800 | 50% | 50% |
| 6 | 280 | 2100 | 45% | 55% |
| 7 | 260 | 2380 | 40% | 60% |
| 8 | 240 | 2640 | 35% | 65% |
| 9 | 220 | 2880 | 30% | 70% |
| 10 | 200 | 3100 | 25% | 75% |
| 11 | 180 | 3300 | 20% | 80% |
| 12 | 160 | 3480 | 15% | 85% |
| 13 | 140 | 3640 | 10% | 90% |
| 14 | 120 | 3780 | 5% | 95% |
| 15 | 100 | 3900 | 0% | 100% |

(58) Field of Classification Search
USPC .................................. 318/599, 811, 685, 696
See application file for complete search history.

(56) References Cited

U.S. PATENT DOCUMENTS

2011/0217183 A1* 9/2011 Piai .......................... F04B 23/02
417/44.1
2015/0333685 A1* 11/2015 Wei .......................... H02P 27/16
318/430

OTHER PUBLICATIONS

Written Opinion of the International Searching Authority, dated Oct. 6, 2016, in PCT/EP2016/065453, filed Jul. 1, 2016.

* cited by examiner

| Step | Step Duration (ms) | Time (ms) | Percentage of pulse cut (%) | Pump power (%) |
|---|---|---|---|---|
| 0 | 400 | 0 | 75% | 25% |
| 1 | 380 | 400 | 70% | 30% |
| 2 | 360 | 780 | 65% | 35% |
| 3 | 340 | 1140 | 60% | 40% |
| 4 | 320 | 1480 | 55% | 45% |
| 5 | 300 | 1800 | 50% | 50% |
| 6 | 280 | 2100 | 45% | 55% |
| 7 | 260 | 2380 | 40% | 60% |
| 8 | 240 | 2640 | 35% | 65% |
| 9 | 220 | 2880 | 30% | 70% |
| 10 | 200 | 3100 | 25% | 75% |
| 11 | 180 | 3300 | 20% | 80% |
| 12 | 160 | 3480 | 15% | 85% |
| 13 | 140 | 3640 | 10% | 90% |
| 14 | 120 | 3780 | 5% | 95% |
| 15 | 100 | 3900 | 0% | 100% |

CONTROL SYSTEM FOR PUMP OF BEVERAGE PREPARATION MACHINE

CROSS-REFERENCE TO RELATED APPLICATIONS/INCORPORATION BY REFERENCE STATEMENT

This application is a US national stage application filed under 35 USC § 371 of International Application No. PCT/EP2016/065453, filed Jul. 1, 2016; which claims priority to EP App No. 15175206.0, filed Jul. 3, 2015. The entire contents of the above-referenced patent applications are hereby expressly incorporated herein by reference.

TECHNICAL FIELD

The present disclosure relates to control of a pump of a beverage or foodstuff preparation machine. In particular, the disclosure relates to such a machine with said control and to a method of, and computer program for, controlling said pump.

BACKGROUND

Increasingly machines for the preparation of a beverage or foodstuff are configured to operate using a container that comprises a single-serving of a beverage or foodstuff material, e.g. coffee, tea, ice cream, yoghurt. The machine may be configured for preparation by processing said material in the container, e.g. with the addition of fluid, such as milk or water, and the application of mixing thereto, such a machine is disclosed in PCT/EP13/072692. Alternatively, the machine may be configured for preparation by at least partially extracting an ingredient of the material from the container, e.g. by dissolution or brewing. Examples of such machines are provided in EP 2393404 A1, EP 2470053 A1, WO 2009/113035.

The increased popularity of these machines may be partly attributed to enhanced user convenience compared to a conventional machine, e.g. compared to a manually operated stove-top espresso maker or cafetiére (French press).

In particular the aforesaid machines comprise a component processing unit, which is operable to process the material via the application of a fluid (typically water) to the desired beverage or foodstuff. Accordingly, the component processing unit comprises a pump, such as an induction pump, to supply the fluid from a reservoir. It is desirable to reduce the noise of the machine when executing a preparation operation, particularly when the machine is used in a home environment. The vibrations from the pump in particular cause the most substantial noise.

Accordingly, there is a need to reduce the noise of the pump in such machines. Various approaches have been developed: an example is provided in EP 2410894, wherein the pump is mounted to an elastic member configured to isolate the pump from the remainder of the machine to reduce transmission of pump vibrations. A further approach is provided in EP 2180812, wherein the voltage of electrical energy supplied to the pump is controlled during start-up of the pump. In particular, during a start-up phase the voltage may be ramped up in a linear fashion to the nominal operating voltage. A drawback of controlling the voltage in this manner is that there remains an undesirable amount of noise.

BRIEF DESCRIPTION OF THE DRAWINGS

For a better understanding of the present disclosure, and to show how embodiments of the same may be carried into effect, reference will now be made, by way of example, to the accompanying diagrammatic drawings in which.

DETAILED DESCRIPTION

One non-limiting object of the present disclosure is to provide a beverage or foodstuff preparation machine with reduced noise.

It would be advantageous to provide such a machine with reduced noise which is cost effective and convenient to manufacture.

It would be advantageous to provide a means for reduced noise which current beverage preparation machines (i.e. those currently in service and those for which current assembly lines exist) can conveniently implement.

It would be advantageous to provide a computer program for reduced noise which is convenient to program.

Objects of the present disclosure are achieved by: the beverage preparation machine according to claim 1; the method according to claim 12; the computer program according to claim 14; the non-transient computer readable medium according to claim 15.

Disclosed herein according to a first non-limiting aspect of the present disclosure is a beverage or foodstuff preparation machine comprising: a component processing unit operable to prepare a beverage or foodstuff from a beverage or foodstuff component (e.g. beverage or foodstuff material, or a container containing said material), said component processing unit comprising a pump arranged to deliver fluid (e.g. water or milk, both of which may be heated) to said component; a control system configured to control a waveform (e.g. the voltage or current waveform) of electrical energy supplied to the pump, wherein said control comprises during a start-up phase (during which the electrical energy applied to the pump is increased from zero to a nominal operating electrical energy) chopping (e.g. to remove within the duration associated with the chop, e.g. from a position of zero voltage crossing or other point) a portion of a period of a repeating unit of said waveform, whereby the portion chopped varies between a start and an end of the start-up phase in a non-linear manner with respect to time and with a greater rate change (e.g. the change in the amount chopped with respect to time) proximate the end. Proximate the end can be defined as a period before the end including at the end. The said period before the end can be during the final 20% or 30% or 40% of the start-up phase. The rate during this period can be the average rate, i.e. to account for localised variations in the rate. The rate is greater in comparison to the rate during the rest of the start-up phase, i.e. a period proximate the start of the start of the start-up phase. Proximate the start can be defined as a period at the start including at the start. The said period at the start can be during the first 20% or 30% or 40% of the start-up phase. The rate during this period can be the average rate, i.e. to account for localised variations in the rate.

Accordingly, objects of the present disclosure are achieved since at the start of the start-up phase: there is a lower rate change in the power, and/or a lower initial power, whilst the fluid line (i.e. the line through which fluid is pumped by the pump) is partially or fully empty; there is a higher rate of change in the power when the fluid line is full. In particular it has been found that high power applied to an empty fluid line is particularly noisy. In the present disclosure, once the fluid line is full the rate of change in the power and power is greater since under this condition the noise is less substantial.

Moreover, the beverage or foodstuff component (which is typically ground coffee) generally only receives fluid at high pressure, i.e. after the fluid line has been filled: it has been found that a gradual increase in pressure from supplied fluid, from a low pressure, can be detrimental to product quality.

The end of the start-up phase may be defined by the amount of waveform chopped being zero. In certain non-limiting embodiments, the portion chopped is greater (greater may be defined to include all portions chopped are greater or generally greater to give the equivalent effect) proximate a start of the start-up phase than proximate the end of the start-up phase. The portion chopped may progressively decrease in size with time during the start-up phase. Chopping may be defined as removing the portion of the repeating unit such that the amplitude (typically the voltage) of the chopped portion is set to zero (or the baseline amount).

In certain non-limiting embodiments, the control system is configured to decrease the portion chopped (e.g. from the initial amount at the start) at a particular rate (e.g. a low rate which may be approximately a constant rate of decrease) or maintain the portion chopped as constant, for example (but not by way of limitation) during said start (e.g. not proximate said end) and optionally during filling of a fluid line through which the pump pumps fluid and to increase the rate of decrease once filled.

It will be appreciated that the amount of fluid that requires pumping to fill the fluid line will vary with the configuration of the fluid line and the pump operation. For a typical beverage or foodstuff machine the fluid line is filled in 1-3, such as (but not limited to) about 2 seconds or 40-80% of the start-up duration, at which point the percentage of chopping of the period or pulse may be about 40-60%. Chopping may be selected to: initially fill the fluid line gradually at reduced power; upon filling of the fluid line increase the power at a greater rate to the nominal amount.

The control system may be configured to determine filling (i.e. when the fluid line is full or is approximately full) of the fluid line (e.g. by means determining a particular time delay from initiation of start-up or by means of a sensor). The control system may be configured to increase the rate of change in chopping in response to said determination. The sensor may be a flow meter (e.g. filling of the fluid line is determined by a correspondence in mass continuity between the amount of fluid pumped at the pump and the amount sensed).

During the start-up phase the portion of the waveform which is chopped may vary exponentially (e.g. including generally or substantially exponentially to have the same effect as exponentially) with respect to time, e.g. the amount which is chopped at the start is greatest but does not vary much, with the amount which is chopped being less and less, varying in an exponential manner with increasing time (alternatively put the amount chopped is a negative exponent of the time). During the start-up phase the power applied to the pump may vary exponentially (e.g. including generally or substantially exponentially to have the same effect as exponentially) with respect to time, e.g. at the end the power exponentially increases to the nominal amount.

The start-up phase may be composed of a series of steps, whereby for each step the portion of the period chopped is constant (e.g. including fully or substantially to have the net effect constant). The change in the portion of the period chopped between adjacent steps varies in the aforesaid manner e.g. to give the said non-linear variation and rate changed when averaged. Advantageously by holding the percentage chopping constant for a step, a computer program to implement the said control is considerably more convenient to program.

There may be 5-50 or 10-20 steps. In certain non-limiting embodiments, it may be desirable to have a greater number of steps for longer duration start-up phases to reduce the apparent noise to the end user when transitioning between a step. The duration of a step may be 50-600 ms. More particularly, the duration of a step may decrease during the start-up phase, e.g. it is 300-500 ms at start, 200-50 ms at end. The power may increase linearly for progressive steps. The portion chopped may decrease linearly for progressive steps. Advantageously, the power curve can be conveniently controlled by optimizing the step duration.

Herein a waveform is defined as the overall shape of the wave of the electrical energy, i.e. it comprises a plurality of repeating units. The repeating units are generally periodic, i.e. they have the same duration time period. It will be appreciated that normal variations (e.g. noise) in the electrical energy will cause the shape and duration of the repeating units of fluctuate locally.

At the start (which may be defined to include exactly at start up or during the first 5 or 10% of the duration of start-up) of start-up, the portion of the period chopped may be 90-50% or 80-70% of the period and/or a pulse associated with the period.

Period herein is defined as the time duration of a complete cycle of a repeating unit. It may for example comprise a cycle of an AC waveform, i.e. a positive and negative pulse. It may also comprise a pulse, i.e. the repeating unit of a DC waveform. Pulse herein is defined as the positive or negative component of a cycle of an AC waveform, for a DC waveform a pulse generally comprises a cycle. A half wave rectified AC waveform comprises a period with a pulse and a portion at baseline value.

Generally, the waveform is chopped from the point of zero crossing of the voltage, (however it can be chopped from elsewhere, e.g. the peak voltage or a point on the current waveform) up to the subsequent point of zero crossing. Typically the zero crossing point from which chopping extends is the rise in voltage.

The start-up phase may have a time duration of 2-6 seconds, such as (but not limited to) about 4 seconds. In certain non-limiting embodiments, it may be desirable to have a short start-up time for reasons of product quality and end user convenience.

The control system may comprise a power supply, (e.g. portable supply such as a battery or power supply unit for receiving mains electrical energy, e.g. with a conditioner, transformer etc) to supply electrical energy to the pump, an electrically operated switch (e.g. a triac or transistor or thyristor) arrange to effect said chopping of the waveform of the electrical energy to the pump; and a processor to control the electrically operated switch. The control system may further comprise a voltage sensor (e.g. a divider arrangement or potentiometer) for measuring the voltage of the electrical energy, wherein the sensor is connected to the processor and may be for determination of voltage zero-crossing.

The component processing unit may be configured to prepare the beverage or foodstuff from a beverage or foodstuff component comprising container comprising beverage or foodstuff material (e.g. as a powder, extract or a liquid). Alternatively said component comprises said material in situ. The container may comprise a packet, capsule or receptacle for end user consumption therefrom. The container may be a single serving, single use container. Following a preparation process the container may not be reusable, e.g. is it perforated and/or the beverage or foodstuff material is spent.

In certain non-limiting embodiments, the component processing unit is a pressurized brewing unit, e.g. the component is subject to 5-20 bar during brewing. In certain non-limiting embodiments, the pump is an induction pump, although other pump types can be used, e.g. a rotary pump.

Disclosed herein according to a second non-limiting aspect of the present disclosure is provided a method of controlling a pump of a beverage or foodstuff preparation machine as defined in the first aspect. The method comprising: during a start-up phase: chopping a portion of a period of a repeating unit of a waveform of electrical energy to the pump, whereby the portion chopped varies between a start and an end of the start-up phase in a non-linear manner with respect to time and with a greater rate change proximate said end. The method may comprise increasing the portion chopped at a lower rate or maintaining the portion chopped as constant during filling of a fluid line through which the pump pumps fluid and increasing said rate once the fluid line is filled. The method may comprise determining once the fluid line is filled (e.g. with a known time delay from initiation of start-up or by means of a dedicated sensor). The method may further comprise controlling the pump in accordance with any of the previous aspects.

Disclosed herein according to a third non-limiting aspect of the present disclosure is provided a computer program for a processor of a control system of a beverage or foodstuff preparation machine according to any feature of the first aspect. The computer program comprising program code to control (e.g. when executed) (e.g. via a signal to an electrically operated switch) a waveform of electrical energy applied to a pump of said machine, wherein said control comprises during a start-up phase effecting chopping of a portion of the period of the waveform, whereby the portion chopped varies between a start and an end of the start-up phase in a non-linear manner with respect to time and with a greater rate change proximate said end.

The computer program may further comprise program code to effect control of the electrical energy in accordance with any of the previous aspects. In particular it may comprise program code to determine a point of voltage zero-crossing and apply said chopping from this point.

The program code may be for programing of the processor, e.g. for upload onto a memory unit thereof, or for programing of programmable logic of the processor (e.g. for an FPGA).

Disclosed herein according to a fourth non-limiting aspect of the present disclosure is provided a non-transitory computer readable medium comprising the computer program according to the directly preceding claim. The non-transitory computer readable medium may comprise a memory unit of the processor or other computer-readable storage media for having computer readable program code stored thereon for programming a computer, e.g. a hard disk, a CD-ROM, an optical storage device, a magnetic storage device, Flash memory.

Disclosed herein according to a fifth non-limiting aspect of the present disclosure is provided a computer implemented method for implementing the method associated with the computer program of the third aspect.

The above non-limiting aspects of the present disclosure may be combined in any suitable combination. Moreover, various features herein may be combined with one or more of the above aspects to provide combinations other than those specifically illustrated and described. Further objects and advantageous features of the present disclosure will be apparent from the claims, from the detailed description, and annexed drawings.

Beverage/Foodstuff Preparation System

Figure 1:
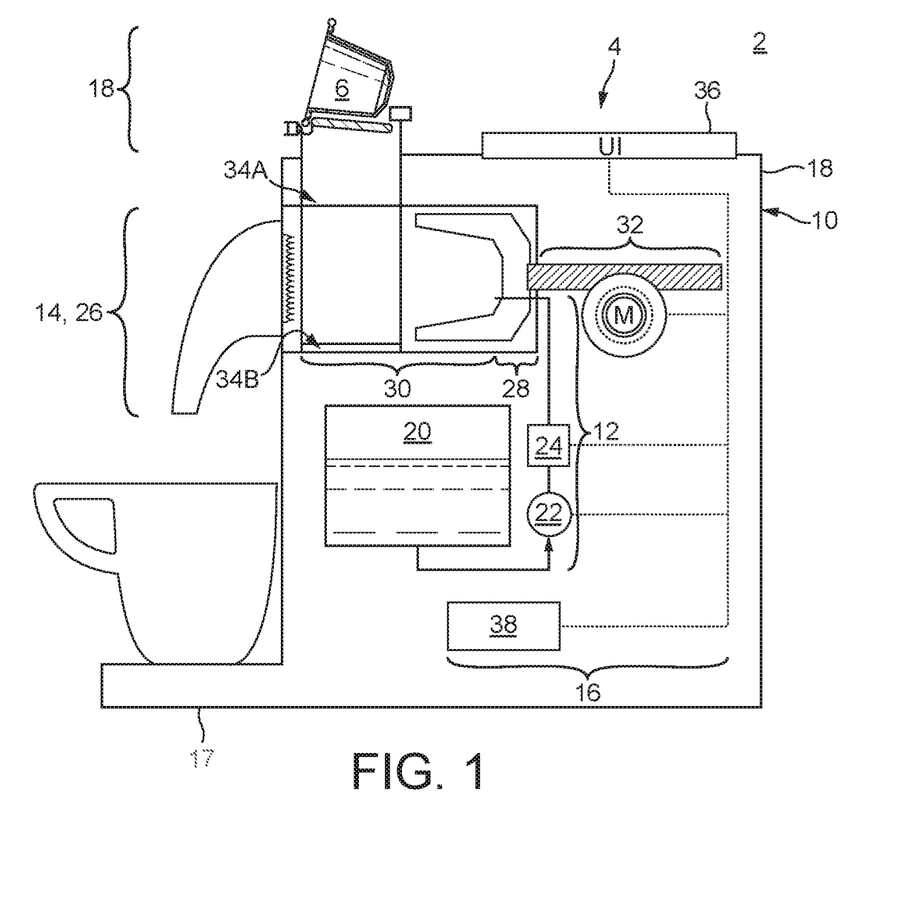
FIG. 1 is an illustrative view of an embodiment of a beverage or foodstuff preparation system that comprises a beverage or foodstuff preparation machine and a container according to the present disclosure.

A beverage or foodstuff preparation system 2, an example of which is illustrated in FIG. 1, comprises at a first level thereof: a beverage or foodstuff preparation machine 4; a container 6, which are described following.

Preparation Machine

The beverage or foodstuff preparation machine 4 is operable to process a beverage or foodstuff component, which may comprise a container containing a portion of beverage or foodstuff material (hereon material), or the material in situ, to a foodstuff and/or beverage for consumption by eating and/or drinking. A foodstuff material as defined herein may comprise a substance capable of being processed to a nutriment generally for eating, which may be chilled or hot, non-exhaustive examples of which are: yoghurt; mousse; parfait; soup; ice cream; sorbet; breakfast cereals; semolina; couscous; custard; smoothies. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. a said machine 4 can prepare both a foodstuff and a beverage.

The preparation machine 4 is generally dimensioned for use on a work top, i.e. it is less than 70 cm in length, width and height. The preparation machine 4 comprises at a first level thereof: a housing 10; a component processing unit 14; and a control system 16, which are described sequentially as follows.

Housing

The housing 10 houses and supports said machine first level components and comprises at a second level of the preparation machine 4: a base 17 for abutment of a horizontally arranged support surface; a body 18 for mounting thereto the other first level components.

Component Processing Unit

Depending on the particular embodiment the component processing unit 14 is operable to prepare a foodstuff/beverage by processing material arranged in: a single-serving, single use container 6 that is a packet or capsule; a container 6 that is a receptacle for end-user consumption therefrom; and a combination thereof. Embodiments of each configuration will be discussed.

In general in all the embodiments the component processing unit 14 comprises at a second level of the preparation machine 4 a fluid supply 12 that is operable to supply fluid to the container 6. The fluid is in general water or milk, the fluid maybe conditioned (i.e. heated or cooled). The fluid supply 12 typically comprises at a third level of the preparation machine 4: a reservoir 20 for containing fluid, which in most applications is 1-5 litres of fluid; a fluid pump 22, such as a reciprocating or rotary pump that may be driven by an electrical motor or an induction coil; an optional fluid heater 24, which generally comprises an in-line, thermo block type heater; an outlet for supplying the fluid. The reservoir 20, fluid pump 22, fluid heater 24, and outlet are in fluid communication with each other in any suitable order and form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the processor 38 as will be discussed.

Component Processing Unit for Extraction of Foodstuff/Beverage from Container

According to an embodiment the component processing unit 14 is operable: to receive the container 6 containing material; process the container 6 to extract one or more ingredients of a beverage therefrom, and to dispense the said ingredients into an alternate receptacle for end-user consumption. The container is generally a single-use, single-serving container such as a capsule or packet.

A component processing unit 14 for use with the said capsule will initially be described, an example of which is shown in FIG. 1. The component processing unit 14 comprises an extraction unit 26 operable to move between a capsule receiving position and a capsule extraction position, when moving from the capsule extraction position to the capsule receiving position, the extraction unit may be moved through or to a capsule ejection position, wherein a spent capsule can be ejected therefrom. The extraction unit 26 receives fluid from the fluid supply 12. The extraction unit 26 typically comprises: an injection head 28; a capsule holder 30; a capsule holder loading system 32; a capsule insertion channel 34A; a capsule ejection channel 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel 34B.

The capsule holder loading system 32 is operable to drive the capsule holder 30 between the capsule receiving position and the capsule extraction position.

The extraction unit 26 can operate by means of injection of fluid at pressure into the cavity of the capsule 6, e.g. at up to 20 bar, which can be achieved by means of the injection head and pump 26. It may alternatively operate by centrifugation as disclosed in EP 2594171 A1, which is incorporated herein by reference.

The aforedescribed component processing units 14 are generally pressurized extraction units, e.g. the component is subject to 5-20 bar during brewing. Generally the pump is an induction pump.

In the example of the container 6 comprising a packet the component processing unit 14 is operable to receive the packet and to inject, at an inlet thereof, fluid from the fluid supply 12. The injected fluid mixes with material within the packet to at least partially prepare the beverage, which exits the packet via an outlet thereof. The component processing unit 14 comprises: a support mechanism to receive an unused packet and eject a spent packet; an injector configured to supply fluid to the packet from the outlet of the fluid supply. Further detail is provided in WO 2014/125123, which is incorporated herein by reference.

Component Processing Unit for Preparation of Foodstuff/Beverage in Container for End User Consumption According to a further embodiment the component processing unit 14 (not shown), is generally operable to prepare material stored in a container 6 that is a receptacle, such as a cup, pot or other suitable receptacle configured to hold approximately 150-350 ml of prepared product. Herein the component processing unit 14 comprises an: agitator unit; an optional auxiliary product unit; thermal exchanger; receptacle support, which will be described sequentially.

The agitator unit is operable to agitate material within the receptacle for at least partial preparation thereof. The agitator unit may comprise any suitable mixing arrangement, e.g. a: planetary mixer; spiral mixer; vertical cut mixer. Typically the agitator unit comprises: an implement for mixing having a mixing head for contact with the material; and a drive unit, such as an electric motor or solenoid, to drive the mixing implement. In a particular (but non-limiting) example of a planetary mixer the mixing head comprises an agitator that rotates with a radial angular velocity W1 on an offset shaft that rotates with gyration angular velocity W2, such an arrangement is disclosed in PCT/EP13/072692, which is incorporated herein by reference.

The auxiliary product unit is operable to supply an auxiliary product, such as a topping, to the container 6. The auxiliary product unit comprises: a reservoir to store said product; an electrically operated dispensing system to effect the dispensing of said product from the reservoir.

The thermal exchanger is operable to transfer and/or extract thermal energy from the receptacle. In an example of transfer of thermal energy it may comprise a heater such as thermo block. In an example of extraction of thermal energy it may comprise heat pump such as a refrigeration-type cycle heat pump.

The receptacle support is operable to support the container during a preparation process such that the container remains stationary during agitation of the material therein by the agitator unit. In certain non-limiting embodiments, the receptacle support is thermally associated with the thermal exchanger such that transfer of thermal energy can occur with a supported receptacle.

In a variant of the above, the component processing unit 14 further comprises a dispensing mechanism for receiving a container 6 (such as a packet) and dispensing the associated material into the receptacle, where it is prepared. Such an example is disclosed in EP 14167344 A, which is incorporated herein by reference.

In a further variant of the above, the component processing unit 14 comprises a dispensing mechanism operable to dispense from a reservoir a single serving of the associated material into the receptacle, where it is prepared and/or to prepare the material in situ before dispensing into the receptacle. Such an example is disclosed in WO 2010/034722 and in WO 2013/014142, which are incorporated herein by reference.

Control System

Figure 2:
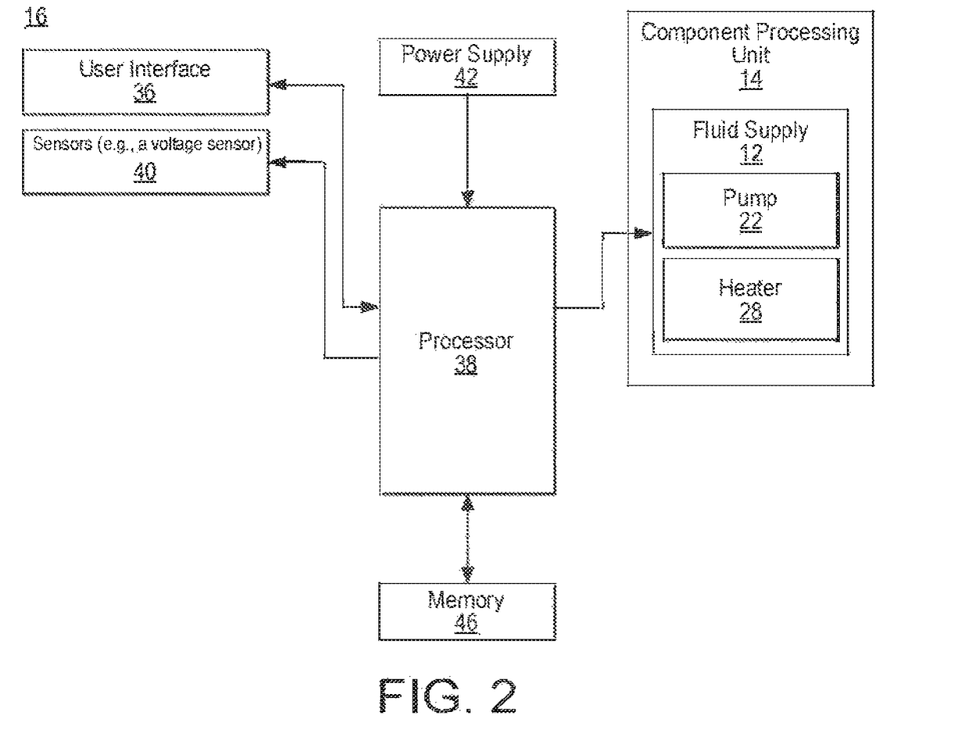
FIG. 2 shows a block diagram of a control system of the machine according to FIG. 1.

The control system 16, an example of which is illustrated in FIG. 2, is operable to control the component processing unit 14 to prepare the beverage/foodstuff. The control system 16 typically comprises: a user interface 36; a processor 38; optional sensors 40; a power supply 42, which are described sequentially.

The user interface 32 comprises hardware to enable an end user to interface with the processor 38 and hence is operatively connected thereto. More particularly: the user interface receives commands from a user; a user interface signal transfers the said commands to the processor 38 as an input. The commands may, for example, be an instruction to execute a preparation process. The hardware of the user interface 32 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 40 are operatively connected to the processor 38 to provide an input for monitoring said process. The sensors 40 typically comprise one or more of the following: fluid temperature sensors; fluid level sensors; position sensors e.g. for sensing a position of the extraction unit 26; flow rate and/or volume sensors.

The processor 38 is generally operable to: receive an input, i.e. said commands from the user interface 32 and/or from the sensors 40; process the input according to program code stored on a memory unit (or programmed logic); provide an output, which is generally the said preparation process. The process may be executed with open-loop control, or in certain non-limiting embodiments, with closed-loop control using the input signal from the sensors 40 as feedback. The processor 38 generally comprises memory, input and output system components, which are arranged as an integrated circuit, typically as a microprocessor or a microcontroller. The processor 38 may comprise other suitable integrated circuits, such as: an ASIC; a programmable logic device such as an FPGA; an analogue integrated circuit such as a controller. The processor 38 may also comprise one or more of the aforementioned integrated circuits, i.e. multiple processors. The processor 38 generally comprises a memory unit 46 for storage of the program code and optionally data. The memory unit 46 typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The power supply 42 is operable to supply electrical energy to the processor 38 and component processing unit 14, and in particular the pump 22 as will be discussed. The power supply 42 may comprise various means, such as a battery or a unit to receive and condition a mains electrical supply.

Control of Pump for Reduced Noise

Figure 3:
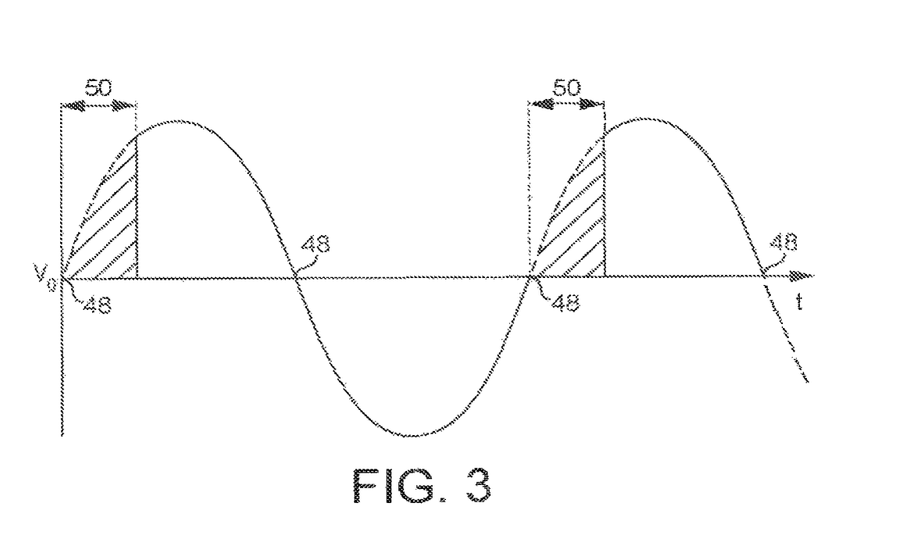
FIG. 3 is an illustrative example of an AC waveform of electrical energy applied to a pump of the system according to FIG. 1.

The control system 16 is operable to control a waveform of the electrical energy supplied to the pump 22 during a preparation operation. In particular the electrical energy comprises a waveform, which is typically an AC waveform however it may also comprise a DC waveform (e.g. a pulsating or a half wave rectified AC waveform). The AC waveform, and example of which is shown in FIG. 3 (which shows 1.5 cycles of the waveform, i.e. 1.5 periods), is generally sinusoidal however atypically it may comprise other suitable waveforms, e.g. saw tooth, square wave. It will also be appreciated that the form is an approximation of the average waveform shape, e.g. local fluctuations due to noise will occur in use.

The control system 16 controls the pump 22 during a beverage or foodstuff preparation process, which generally comprises the pump operating for a start-up phase and a subsequent nominal operating phase. The start-up phase is characterized by the electrical energy being increased from zero to a nominal operating amount. Typically a start-up phase has duration of 2-6 seconds and a preparation process lasts for 30-200 seconds. In certain non-limiting embodiments, it may be desirable for reasons of quality (particularly for preparation of ground coffee) and end-user convenience that the start-up phase be as short a duration as possible. The nominal operating phase commences upon the attaining from start-up phase of a nominal electrical energy of a preparation process.

During start-up the electrical energy is controlled by chopping (i.e. chopping to remove) part of its waveform (such that the chopped portion has the base line value). Generally the portion that is chopped comprises the portion of the period of the waveform that extends from the zero voltage crossing point (although it may extend from elsewhere, e.g. the peak amplitude). An example of such chopping is illustrated for the voltage waveform in FIG. 3, wherein the zero crossing points 48 are those of intersection with the time axis t where the voltage V is zero (the shaded region indicates the portion chopped). In the illustrated example the portion that is chopped 50 may extend anywhere between the zero crossing point at the rise in voltage to the subsequent zero crossing point at the fall in voltage. Herein the portion of the period that is chopped 50 is expressed as a percentage between these two points of zero-crossing, i.e. 100% represents chopping of the entire positive pulse of the waveform. Generally: the maximum that is chopped is 60-80% of the pulse, and occurs at the start of the start-up phase; the nominal operation phase commences when 0% of the pulse is chopped.

Figure 4:
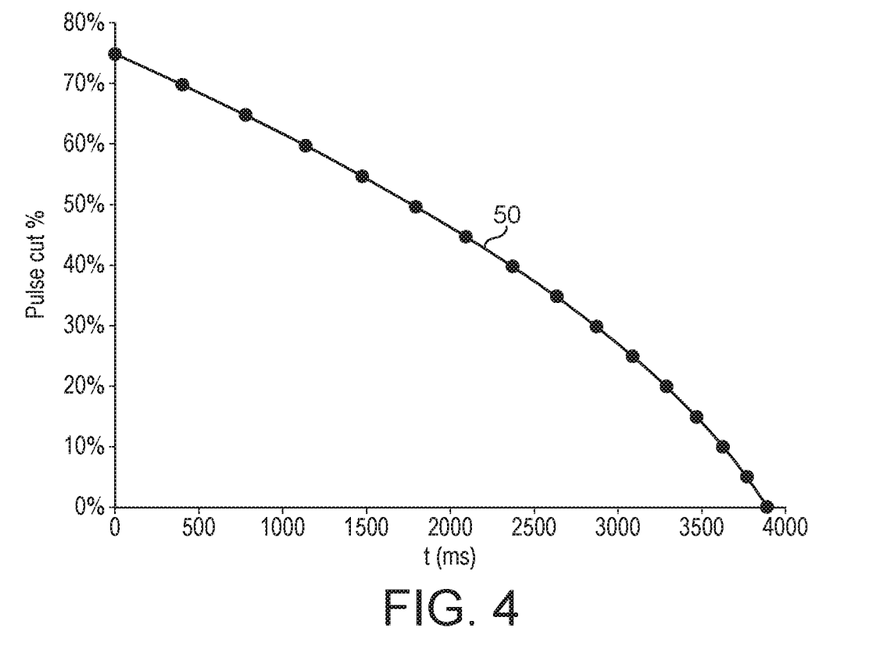
FIG. 4 is a graphical example to scale showing a percentage of a pulse of a period of an AC waveform that is chopped versus time.
Figure 5:
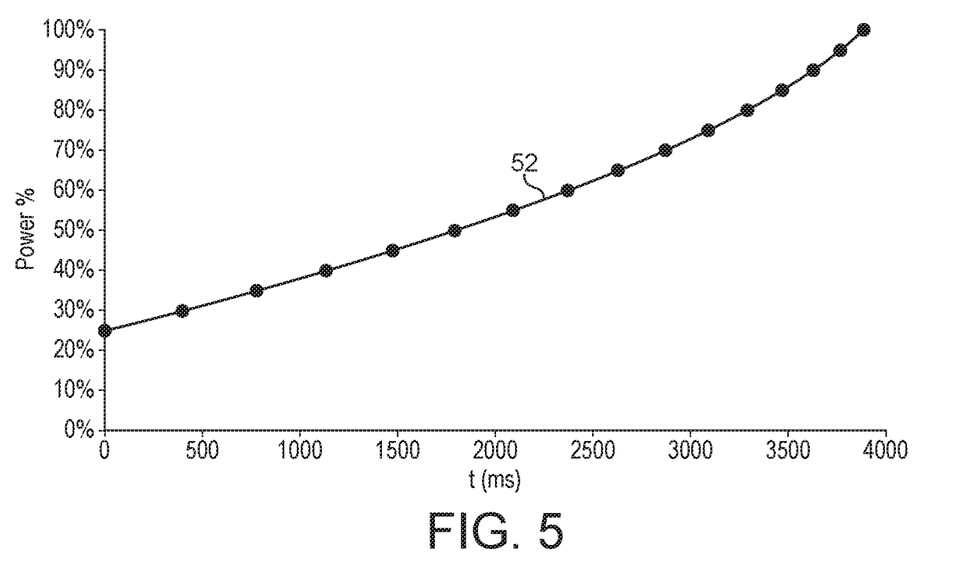
FIG. 5 is a graphical example to scale of the power applied to the pump corresponding to FIG. 4.

In particular the percentage of the pulse of the waveform that is chopped is greater at the start of the start-up phase and decreases to zero at the end of the start-up phase and varies therebetween in a non-linear manner with respect to time with a greater rate change proximate the end of the start-up phase. An example of this variation is shown graphically in FIG. 4, wherein for a start-up phase the percentage of the positive pulse of an AC waveform that is chopped is plotted against time. In particular the percentage of the pulse that is chopped can vary exponentially with respect to time as shown in FIG. 4. In the example the percentage chopped is a function of the time, whereby said function comprises the negative exponent of the start-up time plus the initial amount chopped. Moreover, the corresponding power 52 that is applied to the pump may vary exponentially: the power corresponding to FIG. 4 is shown in FIG. 5.

In certain non-limiting embodiments, the control system is configured to decrease the portion chopped at a lower rate or maintain the portion chopped as constant during filling of the fluid line (whereby filling is defined as applying fluid to: a fluid line which is empty up to a fluid line which is full or is substantially full). After this point the control system may be configured to substantially increase the rate of decrease. An advantage with this mode of operation is that is has been found that a fluid line which is empty/partially full with a high power and/or a high rate of change in power from the pump applied thereto effects a large amount of noise in comparison to the same power applied to a full fluid line. The point at which the fluid line is full can be sensed with the flow meter, or determined after a predetermined time delay from start up. In the graphical examples the fluid line is full between 1-3 seconds, or more precisely about 2 seconds. It will however be appreciated that the said point will vary depending on the configuration of the fluid line.

Figure 6:
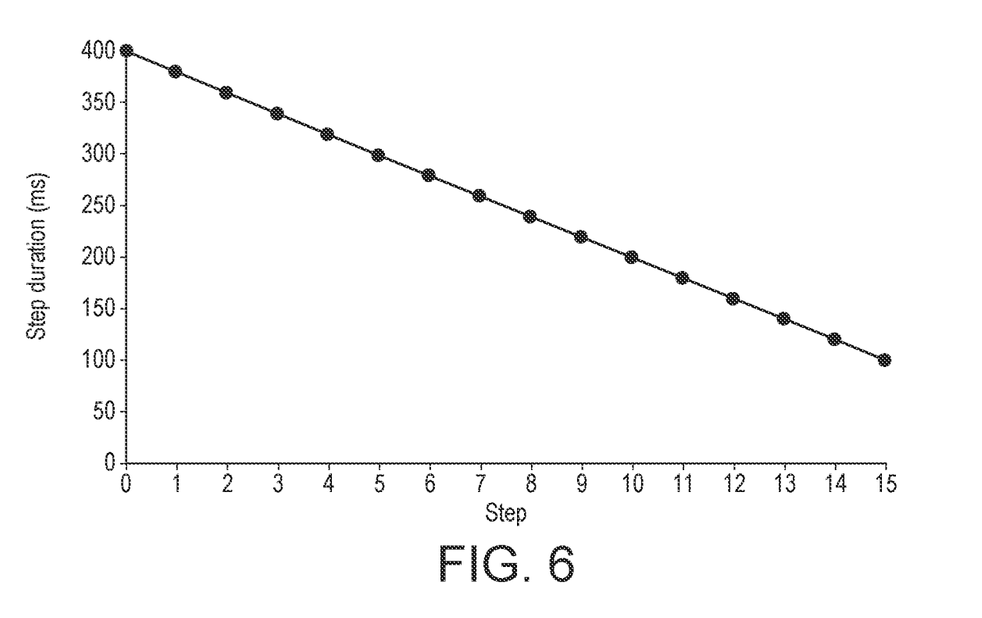
FIG. 6 is a graphical example to scale showing a time step duration versus time which can be used for the graphical distributions of FIGS. 4 and 5.
Figure 7:
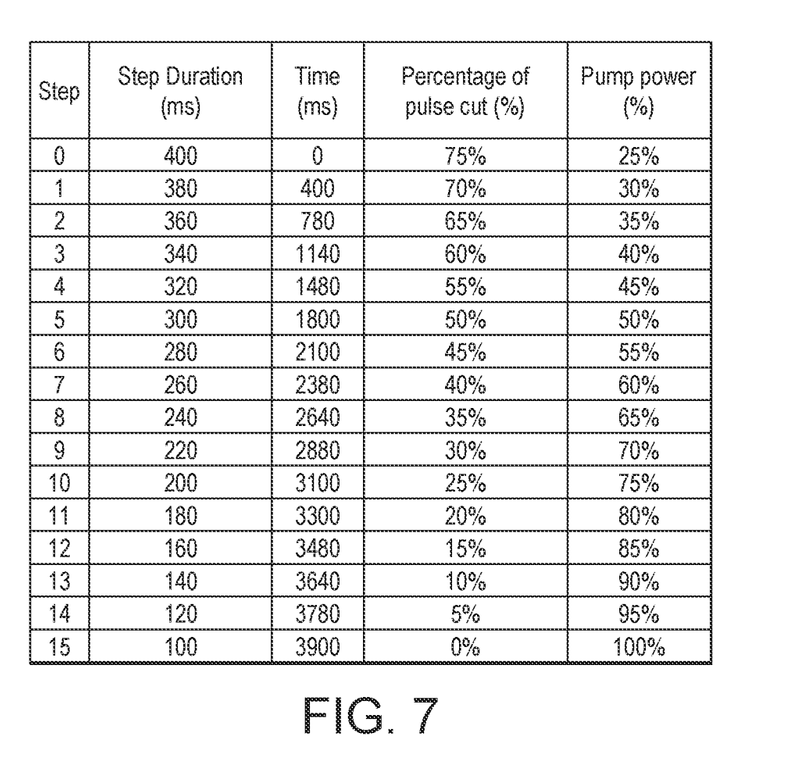
FIG. 7 is a tabulation of the associated graphical distributions of FIGS. 4-6.
Figure 8:
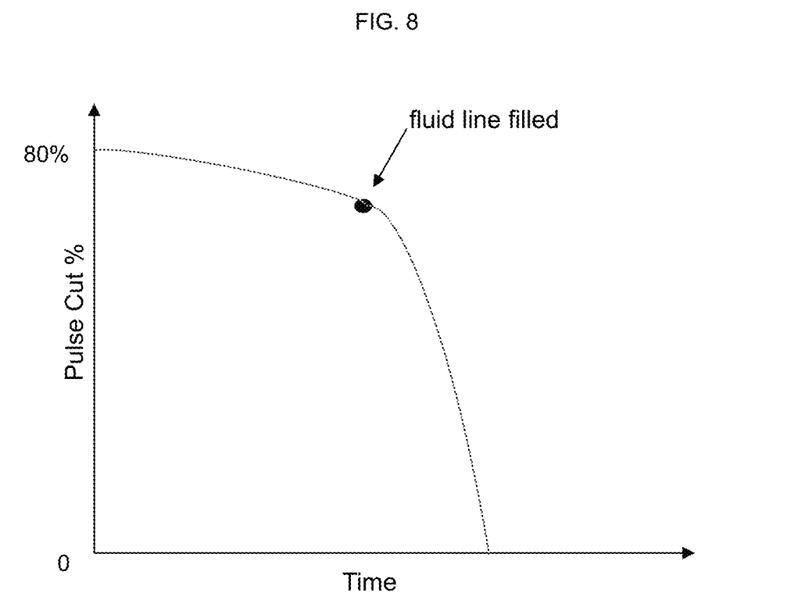
FIG. 8 is a graphical example to scale showing a percentage of a pulse of a period of an AC waveform that is chopped versus time.

In the aforedescribed examples the percentage chopping of the pulse and/or the power can be varied continuously to provide the shown graphical distributions. Alternatively they may be varied in discrete steps, i.e. the percentage chopping is held constant for a particular step and changes for a subsequent step, to give the same distribution when averaged. An advantage is that the complexity of the computer program on the processor 38 is substantially reduced. The number of steps is typically 5-50, or 10-20. In certain non-limiting embodiments, it may be desirable to have a greater number of steps for longer duration start-up phases to reduce the apparent noise to the end user when transitioning between a step. The number of steps and power/chopping increment between steps can be selected to optimally reduce the apparent noise. Referring to the example shown in FIGS. 6 and 7 there are 15 steps for a start-up duration of approximately 4000 ms. A step generally has a duration of 50-600 ms or 100-400 ms.

More particularly the duration of a step may be constant (i.e. the duration of the start-up phase divided by the number of steps). Alternatively the duration of a step may vary, e.g. during the whole or part of the start-up phase. An example of the latter is a progressively decreasing step size, e.g. the step size progressively decreases by increments of a particular amount (which may or may not be a constant amount), such as 5-50 ms or 10-30 ms. In the example shown in FIGS. 6 and 7 the step duration progressively decrease by 20 ms. In a variant the step-size may only progressively decrease proximate the end of the start-up phase, e.g. for the last 30%, or when the fluid line is full.

More particularly, the percentage chopping may progressively decrease as the steps increment, e.g. via a varying amount or a constant amount such as 1-10%, or 2.5-7.5%. In the example shown in FIGS. 6 and 7 the percentage chopping progressively decrease by 5%.

More particularly, the power to the pump may progressively increase as the steps increment, e.g. via a constant amount such as 1-10%, or 2.5-7.5%. In the example shown in FIGS. 6 and 7 the power progressively increases by 5%.

For the aforesaid chopping the processor 38 typically controls via a terminal thereof and electrically operated switch. The electrically operated switch can be arranged in series with the electrical energy. The electrically operated switch may be embodied as various devices depending on the waveform of the electrical energy, e.g. a triac for an AC waveform, a transistor dimmer/thyristor/MOSFET for a DC waveform. The processor 38 may comprise program code to effect (e.g. via the electrically operated switch) the aforesaid chopping of the waveform. In particular the program code may effect said chopping in response to the determination of a zero-crossing point.

For determination of the voltage zero-crossing, the control system may comprise a voltage sensor, such as divider arrangement or potentiometer, which is connected to an analogue signal terminal of the processor 38. The processor 38 may comprises program code to process said signal to determine the zero-crossing point.

LIST OF REFERENCES

2 Beverage or Foodstuff Preparation system
  4 Beverage or Foodstuff Preparation machine
    10 Housing
      17 Base
      18 Body
    14 Component Processing Unit
      12 Fluid supply
        20 Reservoir
        22 Fluid pump
        24 fluid thermal exchanger
      26 Extraction Unit
        28 Injection head
        30 Capsule holder
        32 Capsule holder loading system
        34A Capsule insertion channel
        34B Capsule ejection channel
  16 Control system
    36 User interface
    38 Processor
      46 Memory unit
    40 Sensors (e.g., a voltage sensor)
    42 Power supply
    44 Communication interface
  6 Container (Capsule/Receptacle/packet)

The invention claimed is:

1. A method of controlling a pump of a beverage or foodstuff preparation machine, the method comprising during a start-up phase:
    operating a component processing unit of the beverage or foodstuff preparation machine to prepare a beverage or foodstuff from a beverage or foodstuff component, the component processing unit comprising a pump arranged to deliver fluid to the beverage or foodstuff component;
    operating a control system of the beverage or foodstuff preparation machine to control a waveform of electrical energy supplied to the pump; and
    chopping a portion of a period of a repeating unit of a waveform of the electrical energy supplied to the pump, whereby the portion chopped varies between a start and an end of the start-up phase in a non-linear manner with respect to time, and a rate of change proximate the end of the start-up phase is greater than that proximate the start of the start-up phase,
    wherein the operating of the control system to control the waveform of the electrical energy supplied to the pump comprises increasing electrical energy driving the pump from zero to a nominal power, and
    the operating of the control system to control the waveform of the electrical energy supplied to the pump further comprises decreasing the portion chopped from an initial amount at a non-linear rate during filling of a fluid line through which the pump pumps the fluid and further comprises increasing the non-linear rate once the fluid line is filled.

2. The method according to claim 1, wherein during the start-up phase, the portion chopped and/or a power applied to the pump varies exponentially with respect to time.

3. The method according to claim 1, wherein the start-up phase comprises a series of steps; for each of the steps, the portion of the period chopped is substantially constant; and the change in the portion of the period chopped between adjacent steps provides the rate of change and variation in the portion chopped.

4. The method according to claim 3, wherein a duration of at least one of the steps decreases with increasing time of the start-up phase.

5. The method according to claim 3, wherein a power and/or an amount chopped increases linearly between adjacent steps.

6. The method according to claim 1, wherein the portion of the period chopped is 50-90% of the period or a pulse associated with the period, at or proximate the start of the start-up phase.

7. The method according to claim 1, wherein the start-up phase has a time duration of 2-6 seconds.

8. The method according to claim 1 comprising:
measuring a voltage of the electrical energy supplied to the pump by a voltage sensor of the control system, and determining voltage zero-crossing based on the voltage of the electrical energy supplied to the pump measured by the voltage sensor.

9. The method according to claim 1, wherein the component processing unit comprises a container containing beverage or foodstuff material.

10. The method according to claim 1, wherein the operating of the control system to control the waveform of the electrical energy supplied to the pump initially fills the fluid line gradually at reduced power and upon filling of the fluid line, increases the power at a greater rate to the nominal power.

11. The method according to claim 1 comprising sensing the fluid line with a flow meter.

* * * * *